(12) United States Patent
Huang et al.

(10) Patent No.: US 11,902,898 B2
(45) Date of Patent: *Feb. 13, 2024

(54) WAKE-UP FRAME INDICATION

(71) Applicant: INTEL CORPORATION, Santa Clara, CA (US)

(72) Inventors: Po-Kai Huang, San Jose, CA (US); Noam Ginsburg, Portland, OR (US); Daniel Bravo, Portland, OR (US); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,241

(22) Filed: Jan. 11, 2023

(65) Prior Publication Data
US 2023/0224812 A1  Jul. 13, 2023

Related U.S. Application Data

(63) Continuation of application No. 17/033,449, filed on Sep. 25, 2020, now Pat. No. 11,558,816, which is a continuation of application No. 16/233,069, filed on Dec. 26, 2018, now abandoned.

(51) Int. Cl.
*H04W 52/02* (2009.01)
*H04W 40/00* (2009.01)
*H04W 40/24* (2009.01)

(52) U.S. Cl.
CPC ..... *H04W 52/0229* (2013.01); *H04W 40/005* (2013.01); *H04W 40/244* (2013.01)

(58) Field of Classification Search
CPC . H04W 52/02; H04W 52/0216; H04W 84/12; H04W 52/0229; H04W 84/18; H04W 40/005; H04W 40/244
USPC .......................................................... 370/311
See application file for complete search history.

(56) References Cited

U.S. PATENT DOCUMENTS 11,558,816 B2 *  1/2023  Huang ................ H04W 40/244

* cited by examiner

*Primary Examiner* — Peter G Solinsky
*Assistant Examiner* — Sanjay K Dewan
(74) *Attorney, Agent, or Firm* — Eversheds Sutherland (US) LLP

(57) ABSTRACT

This disclosure describes systems, methods, and devices related to wake-up frame indication. A device may determine a wake up receiver (WUR) wake-up frame to be sent to a first station device of one or more station devices. The device may determine one or more indications associated with the first station device, wherein the one or more indications indicate to the first station device, one or more actions to be taken by the first station device after waking up a primary connectivity radio (PCR) of the first station device. The device may cause a medium access control (MAC) layer to encode the WUR wake-up frame with the one or more indications associated with the first station device. The device may cause to send the WUR wake-up frame to the first station device using a physical layer (PHY).

20 Claims, 5 Drawing Sheets

WAKE-UP FRAME INDICATION

CROSS-REFERENCE TO RELATED APPLICATION(S)

This application is a continuation of U.S. Non-Provisional application Ser. No. 17/033,449, filed Sep. 25, 2020, which is a continuation of U.S. Non-provisional application Ser. No. 16/233,069, filed Dec. 26, 2018, which claims the benefit of U.S. Provisional Application No. 62/623,379, filed Jan. 29, 2018, the disclosures of which are incorporated herein by reference as if set forth in full.

TECHNICAL FIELD

This disclosure generally relates to systems and methods for wireless communications and, more particularly, to wake-up frame indication.

BACKGROUND

Advances in wireless communications require the use of efficient batteries to allow users to utilize their devices for longer times between recharges or replacement. The exchange of data in wireless communications consumes power and having repeated recharges or installation of dedicated power lines may result in a relatively negative user experience.

DETAILED DESCRIPTION

Figure 1:
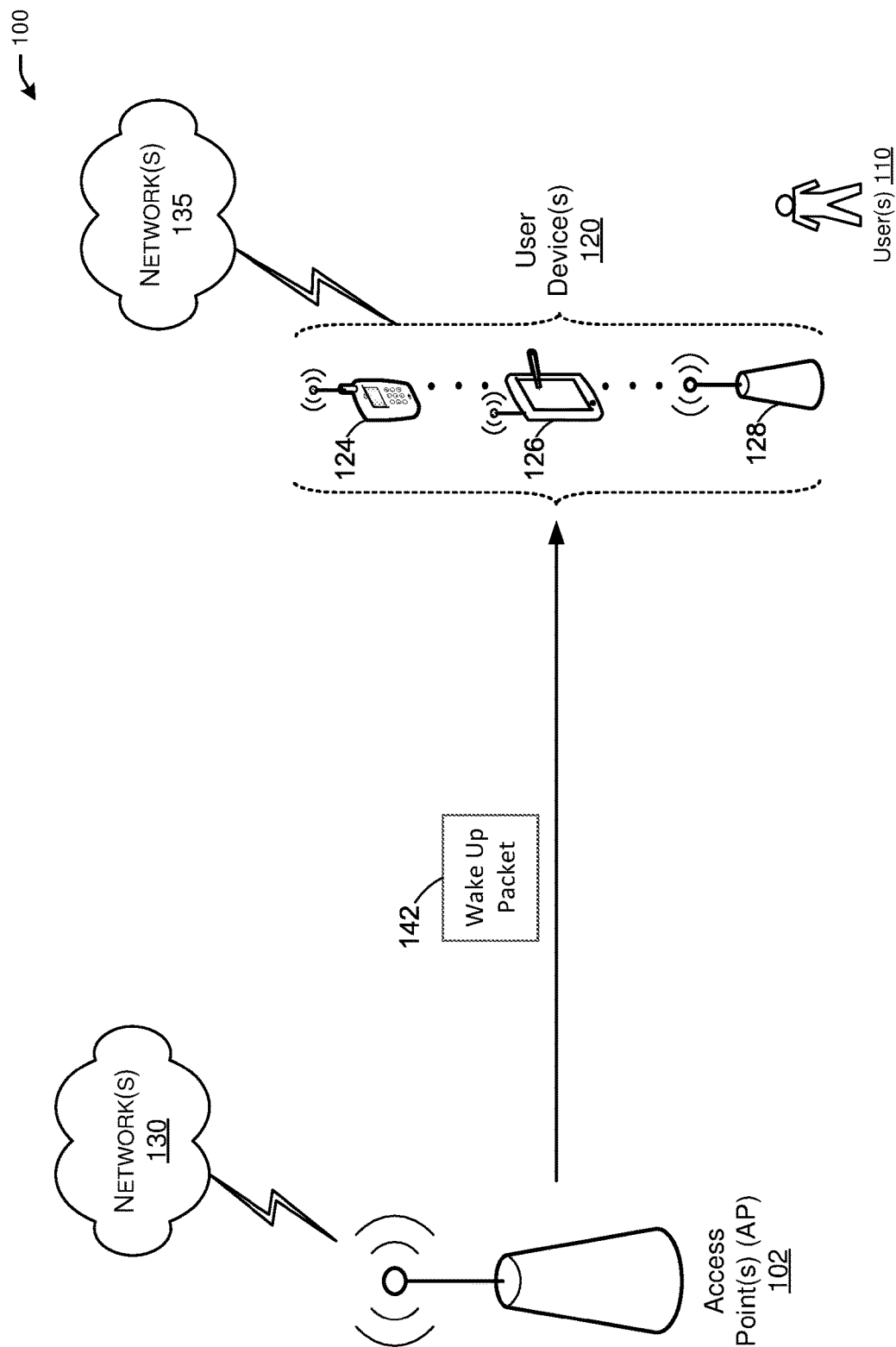
FIG. 1 depicts a network diagram illustrating an example network environment for wake-up frame indication, in accordance with one or more example embodiments of the present disclosure.

Example embodiments described herein provide certain systems, methods, and devices for wake-up frame indication. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Low Power Wake-Up Receiver (LP-WURx) is a technique to enable ultra-low power operation for Wi-Fi device. The idea is for a device to have a minimum radio configuration that can receive wake-up packet from the peer. Hence, the device can stay in low power mode until receiving the wake-up packet from WUR transmitter.

Generally, the transmitter will have a wake-up radio with both transmitting and receiving operation. At the receiver side, only the receiving operation will be implemented, and due to this reason, it is called a wake-up receiver (WURx) at the receiver side.

In primary connectivity radio (PCR) beacon, there is a traffic indication map (TIM), where AP indicates if there are buffered traffic for each associated STA. The exact 802.11 texts are provided as follows: "The TIM shall identify the STAs for which traffic is pending and buffered in the AP. This information is coded in a partial virtual bitmap. In addition, the TIM contains an indication whether group addressed traffic is pending. Every STA is assigned an AID by the AP as part of the association process. AID 0 (zero) is reserved to indicate the presence of buffered non-GCR-SP group addressed bufferable units (BUs). The AP shall identify those STAs for which it is prepared to deliver buffered BUs by setting bits in the TIM's partial virtual bitmap that correspond to the appropriate AIDs." When the STA looks at the bitmap, the STA would look at two bits. The STA would look at bit 0 to see there is group addressed traffic and the STA would look at the corresponding bit for their AID to see if there is individually addressed traffic. This is how the AP uses the TIM bitmap to notify the STA if they have corresponding traffic.

In the 802.11 specification, the operation of a STA after receiving wake-up frame is not defined. From the name of the frame, it is expected that the STA will wake up PCR and using whatever PCR protocols currently defined to retrieve packets from the AP. Not that there are countless number of PCR protocols that can be used to retrieve packets from AP through PCR. For example, Ps-Poll, unscheduled automatic power save delivery (U-APSD), PM mode, target wake time (TWT), etc. As a result, it is hard to describe the behaviors for a STA after receiving wake-up frame. The existing wake-up frame indicates PCR wake-up. Due to the existence of countless PCR protocols to retrieve packets from the AP, it is hard to define a common behavior for all STAs that support wake up receiver (WUR).

Example embodiments of the present disclosure relate to systems, methods, and devices for a wake-up frame indication.

In one embodiment, a wake-up frame indication system may change the indication of a wake-up frame. Instead of indicating PCR wake up, a wake-up frame indication system may facilitate that receiving a wake-up frame is similar to receiving a TIM indication in PCR beacon unless the wake-up frame has additional indication to override the TIM indication. This way the wake-up frame can indicate information typically indicated in the TIM indication in PCR beacon. This is beneficial when the AP has traffic addressed to the group of STAs and/or to an individual STA.

Typically, when the STA wakes up due to receiving a wake-up frame, the STA would be expecting a beacon or a trigger frame. However, when the STA wakes up, it has to wait to receive the beacon frame or the trigger frame to determine if it has traffic addressed to the group of STAs and/or to the STA. A wake-up frame indication system allows an STA to determine what to do when it wakes up without having to rely on the beacon or the trigger frame.

In one embodiment, a wake-up frame indication system may facilitate that TIM indication for wake-up frame may directly connect with the existing PCR behavior without the need to define the specific wake-up behavior after receiving wake-up frame.

In one or more embodiments, the MAC layer prepares the frame and asks the PHY layer to use OOK to transmit the frame using an OOK waveform. On the receiver side, the receiving device (e.g., an STA) may decode the received OOK waveform and reconstruct the MAC frame. The wake-up frame indication system may include the additional information proposed above in the frame at the MAC layer before the transmission to STA.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment of low power wake-up signaling, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 4:
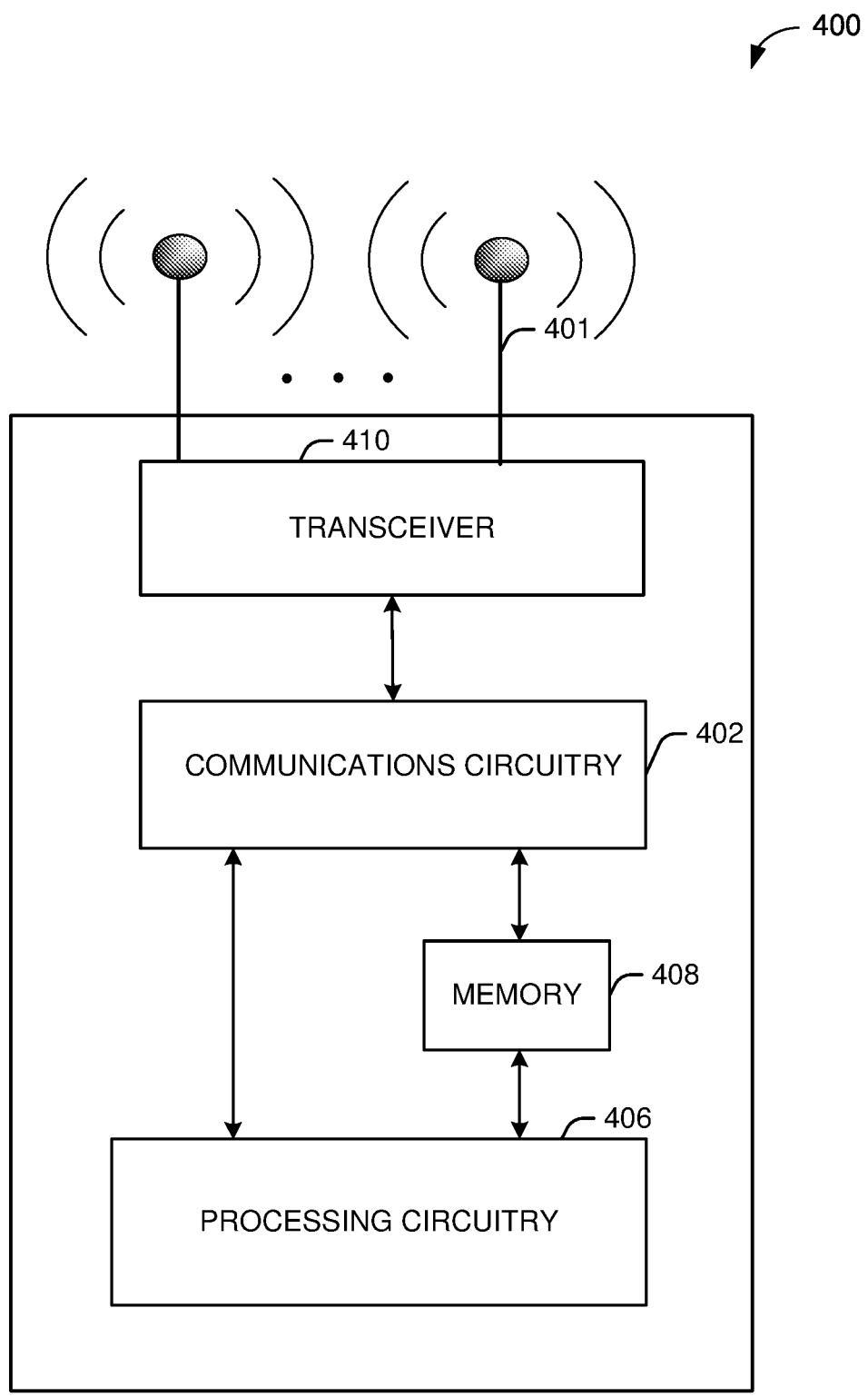
FIG. 4 illustrates a functional diagram of an exemplary communication station that may be suitable for use as a user device, in accordance with one or more example embodiments of the present disclosure.
Figure 5:
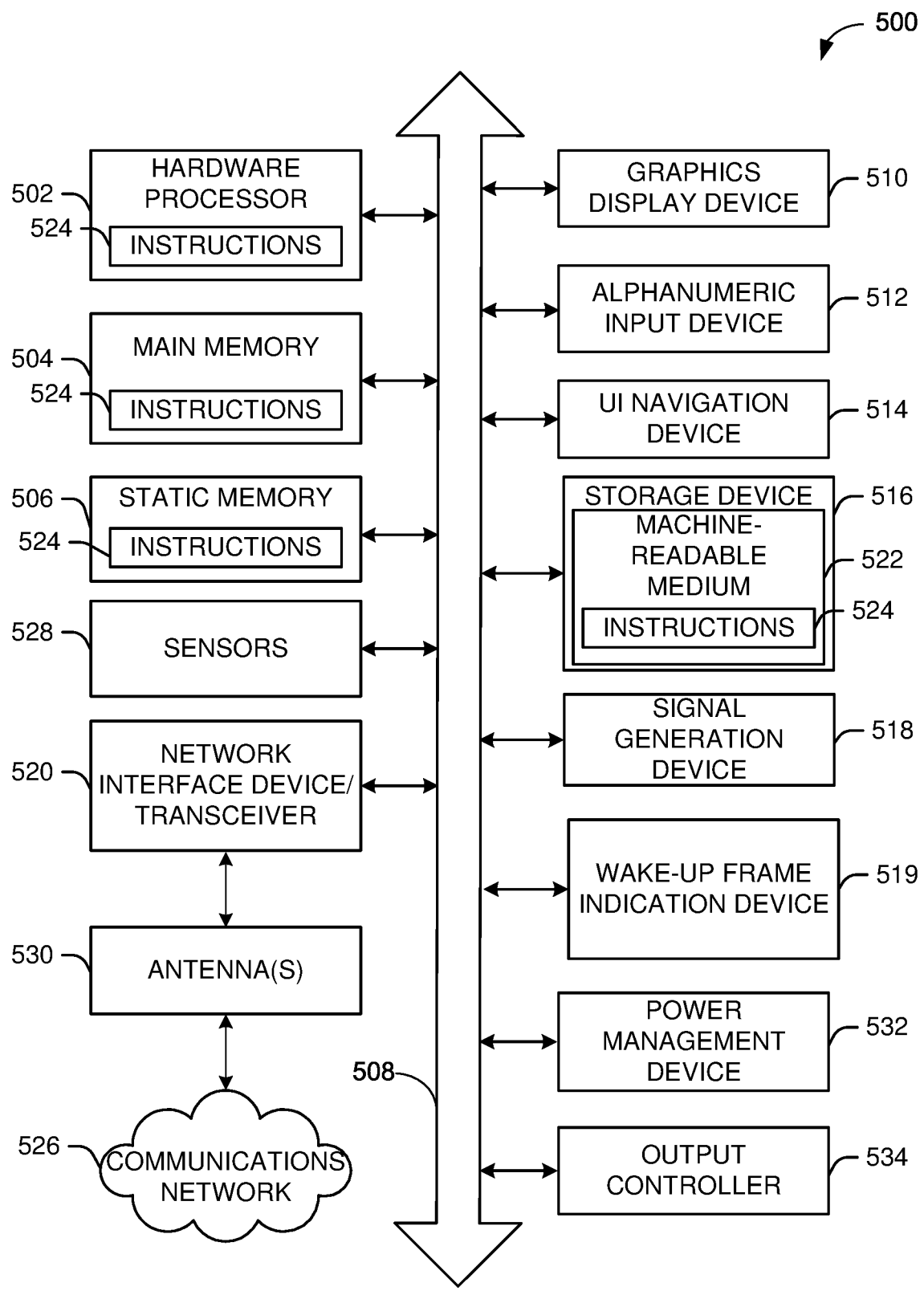
FIG. 5 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 4 and/or the example machine/system of FIG. 5.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The one or more user devices 120 may operate in a low power mode to conserve power. During this time, the LP-WUR of a user device 120 may be active while an 802.11 transceiver may be inactive. Because the LP-WUR may operate in a lower power state than the 802.11 transceiver, power may be conserved on the user device 120. An AP 102 may send a WUR Wake-up frame to a non-AP STA (e.g., a user device 120) to notify the non-AP STA that the AP intends to have PCR operation with the non-AP STA.

In one embodiment, an AP 102 may send one or more WUR wake-up packets 142 to one or more user device(s) 120. A wake-up packet 142 may signal to a user device 120 to activate a higher power mode, which may include activating a higher-powered 802.11 transceiver on the user device 120.

The AP 102 may transmit a WUR Wake-up frame to a non-AP STA to indicate that individually addressed BU(s) are available for the STA via the PCR. The WUR Wake-up frame may include in the address field of the WUR Wake-up frame at least in part an ID that identifies the non-AP STA (e.g., a user device 120), and a group ID that identifies a group of non-AP STAs of which the non-AP STA is a member. For example, the WUR Wake-up frame may comprise a list of identifiers where one of the identifiers identifies the non-AP STA. In some other examples, the AP may transmit a broadcast WUR wake-up frame with Group Addressed BU(s) set to 1 to indicate that group addressed buffered BU(s) are available for all the non-AP STAs via the PCR.

In one embodiment, a wake-up frame indication system may facilitate that receiving a WUR wake-up frame with any individual addressed field identifies the receiving STA in the basic service set (BSS) and indicates to the receiving STA one or more PCR operations to perform after receiving the wake-up frame. Specifically, the wake-up frame may indicate that traffic for the STA is pending and buffered in the AP. Some of the STA's PCR operations can follow similar operations after receiving a TIM indication in a PCR Beacon.

In one embodiment, a wake-up frame indication system may facilitate that receiving a WUR wake-up frame with any group addressed field identifies the receiving STA in the BSS as part of the group is the same as receiving a TIM indication in PCR beacon. However, receiving this type of information in the WUR wake-up frame prevents the STA from wasting energy to wake-up and wait for the PCR beacon frame unnecessarily. This is because a PCR beacon frame may not have specific information for that STA even though it received a WUR wake-up frame. It should be noted that a TIM indication in PCR beacon means that the corresponding bit that identify the STA in the TIM bitmap is set to 1. Specifically, the WUR wake-up frame indicates that traffic for the STA is pending and buffered in the AP. In one embodiment, the STA's PCR operation can then follow the current requirement after receiving a TIM indication in the PCR beacon but this is performed before receiving the PCR beacon.

In one embodiment, there may be additional indication in the wake-up frame. The additional indication can be an indication to check PCR Beacon. Indication to check beacon in PCR can coexist with the TIM indication. The STA's PCR operation can then follow the current baseline requirement after receiving a check beacon field. For example, an AP may transmit a broadcast WUR Wake-up frame to a non-AP STA to indicate that the non-AP STA should check the next beacon frame. The current baseline defined to retrieve packets from the AP. Not that there are countless number of PCR protocols that can be used to retrieve packets from AP through PCR. For example, Ps-Poll, unscheduled automatic power save delivery (U-APSD), Power Management (PM) mode, target wake time (TWT), etc. As a result, it is hard to describe the behaviors for a STA after receiving wake-up frame.

In one embodiment, the additional indication can be an indication of group addressed frame in PCR, which is the same as the AID 0 indication in the TIM. Indication of group addressed frame in PCR can coexist with the TIM indication like the current TIM bitmap. The STA's PCR operation can then follow the current baseline requirement after receiving a TIM indication with bit 0 of TIM bitmap set to 1. The current baseline defined to retrieve packets from the AP. Not that there are countless number of PCR protocols that can be used to retrieve packets from AP through PCR. For example, Ps-Poll, unscheduled automatic power save delivery (U-APSD), Power Management (PM) mode, target wake time (TWT), etc. As a result, it is hard to describe the behaviors for a STA after receiving wake-up frame.

It is understood that the above descriptions are for purposes of illustration and are not meant to be limiting.

Figure 2:
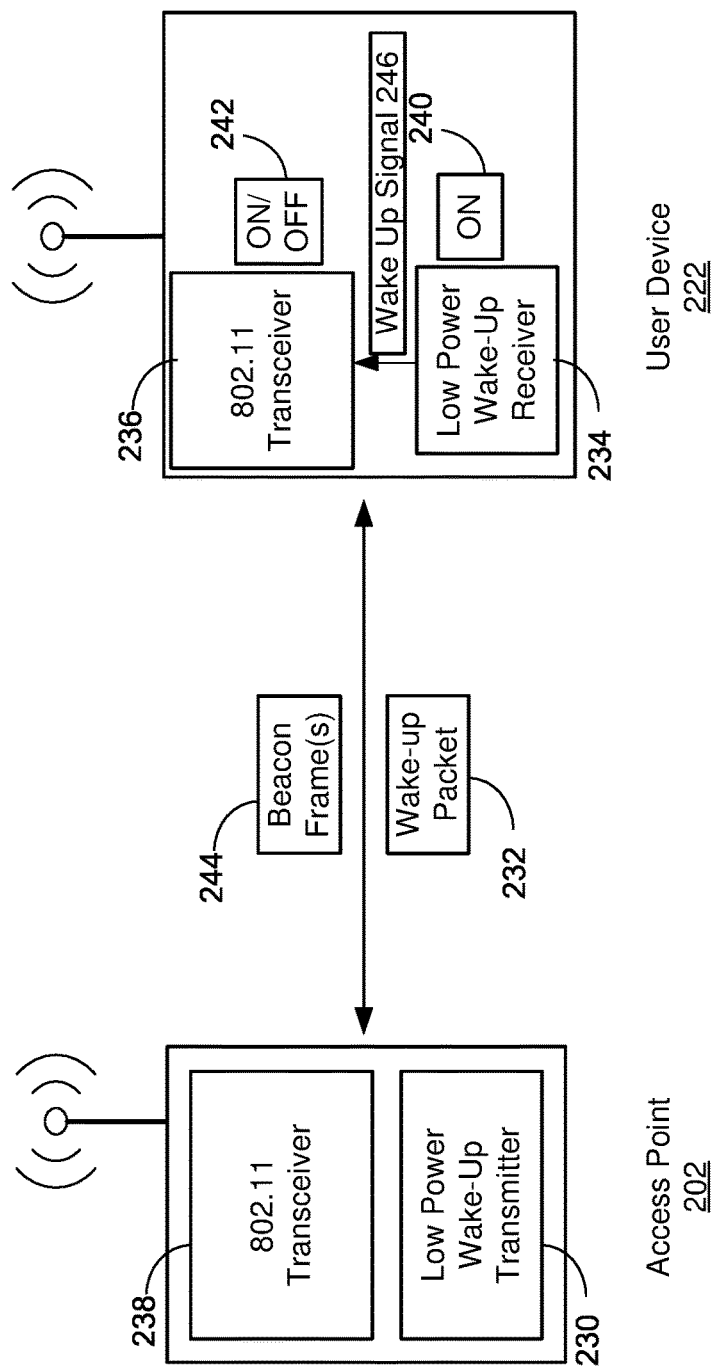
FIG. 2 depicts an illustrative schematic diagram for wake-up frame indication, in accordance with one or more example embodiments of the present disclosure.

FIG. 2 depicts an illustrative schematic diagram for low power wake-up signaling, in accordance with one or more example embodiments of the present disclosure.

Referring to FIG. 2, there is shown a transmitting device (e.g., AP 202) and a receiving device (e.g., user device 222) involved in a transmission session utilizing low-power wake-up signaling. The AP 202 may utilize a low-power wake-up transmitter 230 to send a wake-up packet 232 to the low-power wake-up receiver (LP-WUR) 234 included in the user device 222.

An LP-WUR is a technique to enable ultra-low power operation for Wi-Fi device. The idea is for a device to have a minimum radio configuration that can receive wake up packet from the peer. Hence, the device can stay in low power mode until receiving the wake up packet. FIG. 2 shows an example of a unicast wake-up packet. It is also possible that a transmitter (e.g., an AP) may send a multicast or broadcast wake-up packet to wake up more than one STA.

The LP-WUR 234 may use simple modulation schemes such as on-off keying (OOK), amplitude shift keying (ASK), or frequency shift keying (FSK) for signaling. The LP-WUR 234 may use hardware and/or software components that may allow it to operate at a lower power consumption mode than a typical radio component (e.g., 802.11 transceivers 236 and 238).

The LP-WUR 234 may be constantly active (e.g., ON state 240) on the user device 222 in order to receive a wake-up communication (e.g., the wake-up packet 232). The AP 202 may begin transmitting the wake-up packet 232 using a low-power communication method. The LP-WUR 234 may detect and/or decode the wake-up packet and may determine whether the wake-up packet is destined for the user device 222. If the LP-WUR 234 (or other portions of the user device 222) determines that the receiver address (RA) field of the MAC header from the wake-up packet 232 matches the address of the user device 222, the LP-WUR 234 may then send a wake-up signal 246 to the 802.11 transceiver 236 to power on (e.g., ON/OFF state 242) its circuitry.

The wake-up packet 232 may include timing information such as a wake-up period. The wake-up period may be a period of time that the user device 222 may need to have when devices, such as the AP 202, may be sending data to the user device 222. Following the wake-up period, the user device 222 may power off some or all of its circuitry to reduce power consumption and preserve the life of its battery.

The low-power wake-up transmitter 230 may be a device on the AP 202 that transmits a wake-up packet to other devices (e.g., the user device 222). The low-power wake-up transmitter 230 may transmit at the same simple modulation schemes of the user device 222 (e.g., OOK, ASK, FSK, etc.). The low-power wake-up transmitter 230 may utilize signaling in order to generate and transmit the wake-up packet 232.

Generally, the transmitter (e.g., AP 202) will have a wake-up radio with both transmitting and receiving operation. At the receiver side (e.g., the user device 222), only the receiving operation will be implemented, and due to this reason, it is called a wake-up receiver (WURx) at the receiver side.

It should be noted that a wake-up packet is the same as a wake-up frame. Both terms are understood to be interchangeable. Also note that, the term primary connectivity radio (PCR) is used to refer to the 802.11 radio that is woken up by the WURx but this is not limited to just Wi-Fi radio as the PCR. Note that WUR transmitter is generally the AP, and WUR receiver is on the STA side.

It is understood that the above descriptions are for purposes of illustration and are not meant to be limiting.

Figure 3:
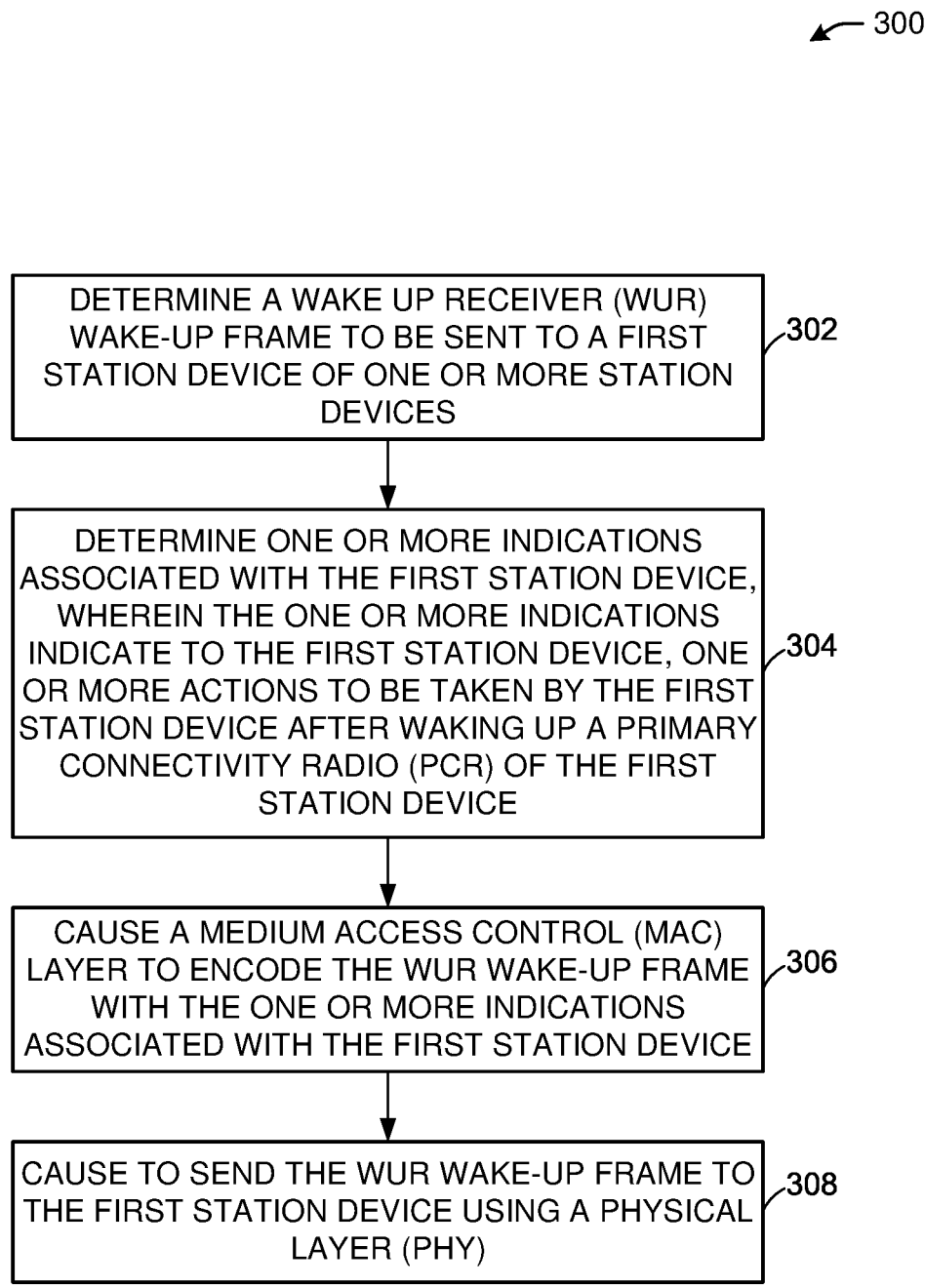
FIG. 3 illustrates a flow diagram of illustrative process for a wake-up frame indication, in accordance with one or more example embodiments of the present disclosure.

FIG. 3 illustrates a flow diagram of illustrative process 300 for an illustrative wake-up frame indication system, in accordance with one or more example embodiments of the present disclosure.

At block 302, a device (e.g., the user device(s) 120 and/or the AP 102 of FIG. 1) may determine a wake up receiver (WUR) wake-up frame to be sent to a first station device of one or more station devices. The WUR wake-up frame is a broadcast frame sent to a group of the one or more station devices, and wherein the first station device is part of the group. The WUR wake-up frame may comprise an address field used to indicate the one or more indications. The address field may comprise an address that individually identifies the first station device. The address field may comprise a group identification that identifies a group of the one or more station devices, wherein each station device in the group has one or more individually addressed bufferable units. Determine an indication in the WUR wake-up frame to indicate that the first station device is to check a PCR beacon frame.

At block 304, the device may determine one or more indications associated with the first station device, wherein the one or more indications indicate to the first station device, one or more actions to be taken by the first station device after waking up a primary connectivity radio (PCR) of the first station device. The one or more indications may indicate to the first station device one or more individually addressed bufferable units associated with the first station device. The one or more indications may to the first station device one or more group addressed bufferable units, and wherein the first station device is part of the group.

At block 306, the device may cause a medium access control (MAC) layer to encode the WUR wake-up frame with the one or more indications associated with the first station device.

At block 308, the device may cause to send the WUR wake-up frame to the first station device using a physical layer (PHY). Sending the WUR wake-up frame to the first station device may indicate to the first station device to retrieve individually addressed bufferable units using its PCR after receiving an indication of one or more individually addressed bufferable units in a PCR beacon frame. Sending the WUR wake-up frame to the first station device may indicate to the first station device to retrieve individually addressed bufferable units using its PCR after receiving an indication of one of more group addressed bufferable units in a PCR beacon frame. The device may cause to send group addressed bufferable units to the first station device after a next PCR delivery traffic indication map (DTIM) beacon frame comprising the group addressed bufferable units. It is understood that the above descriptions are for purposes of illustration and are not meant to be limiting.

FIG. 4 shows a functional diagram of an exemplary communication station 400 in accordance with some embodiments. In one embodiment, FIG. 4 illustrates a functional block diagram of a communication station that may be suitable for use as an AP 102 (FIG. 1) or user device 120 (FIG. 1) in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or media access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in FIGS. 1-3.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements. The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 400 may include one or more processors and may be configured with instructions stored on a computer-readable storage device memory.

FIG. 5 illustrates a block diagram of an example of a machine 500 or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a speaker), a wake-up frame indication device 519, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 502 for generation and processing of the baseband signals and for controlling operations of the main memory 504, the storage device 516, and/or the wake-up frame indication device 519. The baseband processor may be provided on a single radio card, a single chip, or an integrated circuit (IC).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

The wake-up frame indication device 519 may carry out or perform any of the operations and processes (e.g., process 300) described and shown above.

For example, the wake-up frame indication device 519 may change the indication of a wake-up frame. Instead of indicating PCR wake up, a wake-up frame indication system may facilitate that receiving a wake-up frame is similar to receiving a TIM indication in PCR beacon unless the wake-up frame has additional indication to override the TIM indication. This way the wake-up frame can indicate information typically indicated in the TIM indication in PCR beacon. This is beneficial when the AP has traffic addressed to the group of STAs and/or to an individual STA. Typically, when the STA wakes up due to receiving a wake-up frame, the STA would be expecting a beacon or a trigger frame. However, when the STA wakes up, it has to wait to receive the beacon frame or the trigger frame to determine if it has traffic addressed to the group of STAs and/or to the STA. A wake-up frame indication system allows an STA to determine what to do when it wakes up without having to rely on the beacon or the trigger frame.

The wake-up frame indication device 519 may facilitate that TIM indication for wake-up frame may directly connect with the existing PCR behavior without the need to define the specific wake-up behavior after receiving wake-up frame.

The wake-up frame indication device 519 may facilitate that the MAC layer prepares the frame and asks the PHY layer to use OOK to transmit the frame using an OOK waveform. On the receiver side, the receiving device (e.g., an STA) may decode the received OOK waveform and reconstruct the MAC frame. The wake-up frame indication system may include the additional information proposed above in the frame at the MAC layer before the transmission to STA.

It is understood that the above are only a subset of what the wake-up frame indication device 519 may be configured to perform and that other functions included throughout this disclosure may also be performed by the wake-up frame indication device 519.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine a wake up receiver (WUR) wake-up frame to be sent to a first station device of one or more station devices; determine one or more indications associated with the first station device, wherein the one or more indications indicate to the first station device, one or more actions to be taken by the first station device after waking up a primary connectivity radio (PCR) of the first station device; cause a medium access control (MAC) layer to encode the WUR wake-up frame with the one or more indications associated with the first station device; and cause to send the WUR wake-up frame to the first station device using a physical layer (PHY).

Example 2 may include the device of example 1 and/or some other example herein, wherein the one or more indications indicate to the first station device one or more individually addressed bufferable units associated with the first station device.

Example 3 may include the device of example 1 and/or some other example herein, wherein to cause to send the WUR wake-up frame to the first station device indicates to the first station device to retrieve individually addressed bufferable units using its PCR after receiving an indication of one or more individually addressed bufferable units in a PCR beacon frame.

Example 4 may include the device of example 1 and/or some other example herein, wherein the one or more indications indicate to the first station device one or more group addressed bufferable units, and wherein the first station device may be part of the group.

Example 5 may include the device of example 1 and/or some other example herein, wherein to cause to send the WUR wake-up frame to the first station device indicates to the first station device to retrieve individually addressed bufferable units using its PCR after receiving an indication of one of more group addressed bufferable units in a PCR beacon frame.

Example 6 may include the device of example 1 and/or some other example herein, wherein the processing circuitry may be further configured to cause to send group addressed bufferable units to the first station device after a next PCR delivery traffic indication map (DTIM) beacon frame comprising the group addressed bufferable units.

Example 7 may include the device of example 1 and/or some other example herein, wherein the WUR wake-up frame may be a broadcast frame sent to a group of the one or more station devices, and wherein the first station device may be part of the group.

Example 8 may include the device of example 1 and/or some other example herein, wherein the processing circuitry may be further configured to determine an indication in the WUR wake-up frame to indicate that the first station device may be to check a PCR beacon frame.

Example 9 may include the device of example 1 and/or some other example herein, wherein the WUR wake-up frame comprises an address field used to indicate the one or more indications.

Example 10 may include the device of example 9 and/or some other example herein, wherein the address field comprises an address that individually identifies the first station device.

Example 11 may include the device of example 9 and/or some other example herein, wherein the address field comprises a group identification that identifies a group of the one or more station devices, wherein each station device in the group has one or more individually addressed bufferable units.

Example 12 may include a non-transitory computer-readable medium storing computer-executable instructions which when executed by one or more processors result in performing operations comprising: determining a wake up receiver (WUR) wake-up frame to be sent to a first station device of one or more station devices; determining one or more indications associated with the first station device, wherein the one or more indications indicate to the first station device, one or more actions to be taken by the first station device after waking up a primary connectivity radio (PCR) of the first station device; causing a medium access control (MAC) layer to encode the WUR wake-up frame with the one or more indications associated with the first station device; and causing to send the WUR wake-up frame to the first station device using a physical layer (PHY).

Example 13 may include the non-transitory computer-readable medium of example 12 and/or some other example herein, wherein the one or more indications indicate to the first station device one or more individually addressed bufferable units associated with the first station device.

Example 14 may include the non-transitory computer-readable medium of example 12 and/or some other example herein, wherein to cause to send the WUR wake-up frame to the first station device indicates to the first station device to retrieve individually addressed bufferable units using its PCR after receiving an indication of one or more individually addressed bufferable units in a PCR beacon frame.

Example 15 may include the non-transitory computer-readable medium of example 12 and/or some other example herein, wherein the one or more indications indicate to the first station device one or more group addressed bufferable units, and wherein the first station device may be part of the group.

Example 16 may include the non-transitory computer-readable medium of example 12 and/or some other example herein, wherein to cause to send the WUR wake-up frame to the first station device indicates to the first station device to retrieve individually addressed bufferable units using its PCR after receiving an indication of one of more group addressed bufferable units in a PCR beacon frame.

Example 17 may include the non-transitory computer-readable medium of example 12 and/or some other example herein, wherein the operations further comprise causing to send group addressed bufferable units to the first station device after a next PCR delivery traffic indication map (DTIM) beacon frame comprising the group addressed bufferable units.

Example 18 may include the non-transitory computer-readable medium of example 12 and/or some other example herein, wherein the WUR wake-up frame may be a broadcast frame sent to a group of the one or more station devices, and wherein the first station device may be part of the group.

Example 19 may include the non-transitory computer-readable medium of example 12 and/or some other example herein, wherein the operations further comprise determining an indication in the WUR wake-up frame to indicate that the first station device may be to check a PCR beacon frame.

Example 20 may include the non-transitory computer-readable medium of example 12 and/or some other example herein, wherein the WUR wake-up frame comprises an address field used to indicate the one or more indications.

Example 21 may include the non-transitory computer-readable medium of example 20 and/or some other example herein, wherein the address field comprises an address that individually identifies the first station device.

Example 22 may include the non-transitory computer-readable medium of example 20 and/or some other example herein, wherein the address field comprises a group identification that identifies a group of the one or more station devices, wherein each station device in the group has one or more individually addressed bufferable units.

Example 23 may include a method comprising: determining, by one or more processors, a wake up receiver (WUR) wake-up frame to be sent to a first station device of one or more station devices; determining one or more indications associated with the first station device, wherein the one or more indications indicate to the first station device, one or more actions to be taken by the first station device after waking up a primary connectivity radio (PCR) of the first station device; causing a medium access control (MAC) layer to encode the WUR wake-up frame with the one or more indications associated with the first station device; and causing to send the WUR wake-up frame to the first station device using a physical layer (PHY).

Example 24 may include the method of example 23 and/or some other example herein, wherein the one or more indications indicate to the first station device one or more individually addressed bufferable units associated with the first station device.

Example 25 may include the method of example 23 and/or some other example herein, wherein to cause to send the WUR wake-up frame to the first station device indicates to the first station device to retrieve individually addressed bufferable units using its PCR after receiving an indication of one or more individually addressed bufferable units in a PCR beacon frame.

Example 26 may include the method of example 23 and/or some other example herein, wherein the one or more indications indicate to the first station device one or more group addressed bufferable units, and wherein the first station device may be part of the group.

Example 27 may include the method of example 23 and/or some other example herein, wherein to cause to send the WUR wake-up frame to the first station device indicates to the first station device to retrieve individually addressed bufferable units using its PCR after receiving an indication of one of more group addressed bufferable units in a PCR beacon frame.

Example 28 may include the method of example 23 and/or some other example herein, further comprising causing to send group addressed bufferable units to the first station device after a next PCR delivery traffic indication map (DTIM) beacon frame comprising the group addressed bufferable units.

Example 29 may include the method of example 23 and/or some other example herein, wherein the WUR wake-up frame may be a broadcast frame sent to a group of the one or more station devices, and wherein the first station device may be part of the group.

Example 30 may include the method of example 23 and/or some other example herein, further comprising determining an indication in the WUR wake-up frame to indicate that the first station device may be to check a PCR beacon frame.

Example 31 may include the method of example 23 and/or some other example herein, wherein the WUR wake-up frame comprises an address field used to indicate the one or more indications.

Example 32 may include the method of example 31 and/or some other example herein, wherein the address field comprises an address that individually identifies the first station device.

Example 33 may include the method of example 31 and/or some other example herein, wherein the address field comprises a group identification that identifies a group of the one or more station devices, wherein each station device in the group has one or more individually addressed bufferable units.

Example 34 may include an apparatus comprising means for: determining a wake up receiver (WUR) wake-up frame to be sent to a first station device of one or more station devices; determining one or more indications associated with the first station device, wherein the one or more indications indicate to the first station device, one or more actions to be taken by the first station device after waking up a primary connectivity radio (PCR) of the first station device; causing a medium access control (MAC) layer to encode the WUR wake-up frame with the one or more indications associated with the first station device; and causing to send the WUR wake-up frame to the first station device using a physical layer (PHY).

Example 35 may include the apparatus of example 34 and/or some other example herein, wherein the one or more indications indicate to the first station device one or more individually addressed bufferable units associated with the first station device.

Example 36 may include the apparatus of example 34 and/or some other example herein, wherein to cause to send the WUR wake-up frame to the first station device indicates to the first station device to retrieve individually addressed bufferable units using its PCR after receiving an indication of one or more individually addressed bufferable units in a PCR beacon frame.

Example 37 may include the apparatus of example 34 and/or some other example herein, wherein the one or more indications indicate to the first station device one or more group addressed bufferable units, and wherein the first station device may be part of the group.

Example 38 may include the apparatus of example 34 and/or some other example herein, wherein to cause to send the WUR wake-up frame to the first station device indicates to the first station device to retrieve individually addressed bufferable units using its PCR after receiving an indication of one of more group addressed bufferable units in a PCR beacon frame.

Example 39 may include the apparatus of example 34 and/or some other example herein, further comprising causing to send group addressed bufferable units to the first station device after a next PCR delivery traffic indication map (DTIM) beacon frame comprising the group addressed bufferable units.

Example 40 may include the apparatus of example 34 and/or some other example herein, wherein the WUR wake-up frame may be a broadcast frame sent to a group of the one or more station devices, and wherein the first station device may be part of the group.

Example 41 may include the apparatus of example 34 and/or some other example herein, further comprising determining an indication in the WUR wake-up frame to indicate that the first station device may be to check a PCR beacon frame.

Example 42 may include the apparatus of example 34 and/or some other example herein, wherein the WUR wake-up frame comprises an address field used to indicate the one or more indications.

Example 43 may include the apparatus of example 42 and/or some other example herein, wherein the address field comprises an address that individually identifies the first station device.

Example 44 may include the apparatus of example 42 and/or some other example herein, wherein the address field comprises a group identification that identifies a group of the one or more station devices, wherein each station device in the group has one or more individually addressed bufferable units.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
    generate a Wake-up Receiver (WUR) wake-up frame to be sent to a first station device, the WUR wake-up frame comprising:
        a WUR group identification (ID) or a check beacon indication, wherein the WUR group ID indicates group addressed bufferable units (BUs) assigned to the first station device, and wherein the check beacon indicates to the first station device to attempt to receive a beacon frame; and
    transmit the WUR wake-up frame to the first station device, causing the first station device to proceed with operations similar to receiving a traffic indication map (TIM).

2. The device of claim 1, wherein the WUR wake-up frame further comprises an ID field that identifies the first station device, and wherein the ID field indicates a presence of one or more individually addressed BUs associated with the first station device.

3. The device of claim 1, wherein the device is a WUR AP access point, and wherein the first station device is a WUR non-access point (AP) station device.

4. The device of claim 3, wherein a reception of the WUR wake-up frame by the first station device with an indication of BUs causes the first station device to follow existing operation, associated with power save that the WUR AP and the WUR non-AP station device has agreed to use.

5. The device of claim 1, wherein transmitting the WUR wake-up frame to the first station device indicates to the first station device to retrieve the group addressed bufferable units.

6. The device of claim 1, wherein the group ID indicates to the first station device to follow a similar requirement as after receiving a TIM indication with bit 0 of TIM bitmap set to indicate a presence of group addressed bufferable units.

7. The device of claim 1, wherein the WUR wake-up frame is a broadcast frame sent to a group of station devices, and wherein the first station device is part of the group.

8. The device of claim 1, wherein the group of station devices comprises station devices that are associated with a particular group identified by the WUR group ID.

9. A non-transitory computer-readable medium storing computer-executable instructions which when executed by one or more processors result in performing operations comprising:
    generating a Wake-up Receiver (WUR) wake-up frame to be sent to a first station device, the WUR wake-up frame comprising:
        a WUR group identification (ID) or a check beacon indication, wherein the WUR group ID indicates group addressed bufferable units (BUs) assigned to the first station device, and wherein the check beacon indicates to the first station device to attempt to receive a beacon frame; and
    transmitting the WUR wake-up frame to the first station device, causing the first station device to proceed with operations similar to receiving a traffic indication map (TIM).

10. The non-transitory computer-readable medium of claim 9, wherein the WUR wake-up frame further comprises an ID field that identifies the first station device, and wherein the ID field indicates a presence of one or more individually addressed BUs associated with the first station device.

11. The non-transitory computer-readable medium of claim 9, wherein the device is a WUR AP access point, and wherein the first station device is a WUR non-access point (AP) station device.

12. The non-transitory computer-readable medium of claim 9, wherein a reception of the WUR wake-up frame by the first station device with an indication of BUs causes the first station device to follow existing operation, associated with power save that the WUR AP and the WUR non-AP station device has agreed to use.

13. The non-transitory computer-readable medium of claim 9, wherein transmitting the WUR wake-up frame to the first station device indicates to the first station device to retrieve the group addressed bufferable units.

14. The non-transitory computer-readable medium of claim 9, wherein the group ID indicates to the first station device to follow a similar requirement as after receiving a TIM indication with bit 0 of TIM bitmap set to indicate a presence of group addressed bufferable units.

15. The non-transitory computer-readable medium of claim 9, wherein the WUR wake-up frame is a broadcast frame sent to a group of station devices, and wherein the first station device is part of the group.

16. The non-transitory computer-readable medium of claim 9, wherein the group of station devices comprises station devices that are associated with a particular group identified by the WUR group ID.

17. A method comprising:
    generating, by one or more processors, a Wake-up Receiver (WUR) wake-up frame to be sent to a first station device, the WUR wake-up frame comprising:
        a WUR group identification (ID) or a check beacon indication, wherein the WUR group ID indicates group addressed bufferable units (BUs) assigned to the first station device, and wherein the check beacon indicates to the first station device to attempt to receive a beacon frame; and
    transmitting the WUR wake-up frame to the first station device, causing the first station device to proceed with operations similar to receiving a traffic indication map (TIM).

18. The method of claim 17, wherein the WUR wake-up frame further comprises an ID field that identifies the first station device, and wherein the ID field indicates a presence of one or more individually addressed BUs associated with the first station device.

19. The method of claim 17, wherein the device is a WUR AP access point, and wherein the first station device is a WUR non-access point (AP) station device.

20. The method of claim 19, wherein a reception of the WUR wake-up frame by the first station device with an indication of BUs causes the first station device to follow existing operation, associated with power save that the WUR AP and the WUR non-AP station device has agreed to use.

* * * * *